United States Patent [19]

Sharkozy et al.

[11] Patent Number: 4,581,258

[45] Date of Patent: Apr. 8, 1986

[54] PHOTOPOLYMER COATED LITHOGRAPHIC PRINTING PLATE

[75] Inventors: Frank L. Sharkozy, Racine; James A. Kiesler, Somers, both of Wis.

[73] Assignee: Printing Developments, Inc., Racine, Wis.

[21] Appl. No.: 711,741

[22] Filed: Mar. 14, 1985

Related U.S. Application Data

[62] Division of Ser. No. 462,104, Jan. 28, 1983, Pat. No. 4,522,912.

[51] Int. Cl.[4] .................... C09U 7/02

[52] U.S. Cl. .................... 427/343; 430/278; 430/276; 430/525; 428/457; 204/32.1; 204/33; 204/34; 204/51

[58] Field of Search .................... 430/935, 276, 278, 525; 428/457; 204/32.1, 33, 34, 51; 427/343

[56] References Cited

U.S. PATENT DOCUMENTS

| | | | |
|---|---|---|---|
| 2,763,569 | 9/1956 | Bradstreet | 427/314 |
| 2,814,988 | 12/1957 | Bradstreet | 430/302 |
| 3,160,506 | 12/1964 | O'Connor et al. | 430/276 |
| 3,247,791 | 4/1966 | Leonard | 101/454 |
| 3,440,047 | 4/1969 | Levinos et al. | 430/276 |
| 3,979,212 | 9/1976 | Peters et al. | 430/276 |
| 4,371,430 | 2/1983 | Ballarini et al. | 430/525 |
| 4,426,437 | 1/1984 | Fisch et al. | 430/276 |

*Primary Examiner*—Won H. Louie

[57] ABSTRACT

An improved photopolymer coated lithographic printing plate having a thin, glasslike and water insoluble film disposed intermediate a photopolymeric coating and a directly electrodeposited layer of chromium on a sheet metal base substrate, and wherein said film comprises the cured residue of an applied zirconium base water solution.

4 Claims, 2 Drawing Figures

PHOTOPOLYMER COATED LITHOGRAPHIC PRINTING PLATE

This is a division of application Ser. No. 462,104, filed Jan. 28, 1983, now U.S. Pat. No. 4,522,912.

This invention relates to lithographic printing plates and particularly to chrome surfaced lithographic plates incorporating a surface area and porosity modifying coating on the operative chrome surface thereof.

BACKGROUND OF THE INVENTION

Present day photolithographic printing plates are conventionally formed of a mono- or multimetal base substrate having a coating of light sensitive, photochemically reactive material thereon. Such light sensitive, photochemically reactive materials employed in lithography, including presensitized polymer formulations will hereinafter be generally referred to and broadly identified as "photopolymer" or "photopolymeric" coatings or materials.

One widely used example thereof is the conventional bimetal plate formed of an aluminum alloy or stainless steel base substrate having a thin layer of copper on the surface thereof which, in turn, is overlaid by a photopolymer coating thereon. After exposure, the portions of the photopolymeric coating definitive of the non-image areas are removed and the thus exposed underlying copper surface etched away to expose the base substrate surface which is, if it is stainless steel for example, of pronounced water receptive or hydrophilic character. Following such copper removal in the non-image areas, the portions of the photopolymeric coating definitive of the image areas are then removed to expose the underlying oleophilic copper surface thereunder. Plates of this type are generally characterized by high print quality and relatively long press life and, despite their relatively expensive nature, have been extensively used in recent years.

Another and less expensive example thereof is the conventional monometal plate formed of an aluminum alloy base substrate having the surface thereof appropriately grained and anodized and overlaid with a photopolymeric coating. Such coating, which in this type plate is not entirely removed and portions of which ultimately will serve as the oleophilic image defining area of the finished and developed plate, can be either positive or negative working, depending upon its chemical nature. Plates of this type, although relatively less costly and offering simplified processing procedures, are generally characterized by shorter press life and higher frequency of print quality problems occasioned by the durability of the photopolymer surface, the adhesion of the photopolymer to the substrate, and the brittle nature and other characteristics of the anodized non-image defining surface areas on the plate.

The performance inadequacies of the above described monometal presensitized photopolymer type coated plates, sometimes called "surface" plates, together with the inherent more difficult processing requirements for the above described and more expensive bimetal type plate, as compounded by current EPA regulatory requirements relating to the disposition of heavy metals and corrosive etchants, has created a need for an improved photopolymer printing plate that offers the advantageous print quality and long press life characteristics of the bimetal plate with the advantageous simplified processing procedures of the monometal photopolymer coated type plate.

Recent developments in the art have demonstrated the commercial practicality of forming improved photopolymer coated printing plates of the second type described above, i.e. of the type where a developed photopolymer surface is definitive of the image area on a finished plate, by the direct deposition of chromium on a base metal substrate, such as aluminum alloy or steel, overlaid with a coating of either a positive or negative working photopolymer thereon. Normal processing of either of these plates, i.e. positive or negative working, yields a chromium surfaced non-image area which, after finishing, is highly hydrophilic in character. Such plates, as disclosed in copending application Ser. No. 134,636, filed Apr. 11, 1980, present an electrodeposited chromium surface having an improved secondary grain structure characterized by a close packed, cragged surface and a labyrinthine understructure compositely defining an electroplated layer of high surface area and porosity that provides for markedly better adhesion of the pre-exposed photopolymer coating thereon, improved water carrying characteristics in the processed plate, an increased press life because of the improved durability of the chromium surface, and an enhanced print quality on press. The high surface area and porosity characteristics of such electrodeposited chromium layer have somewhat restricted the selection of photopolymeric coatings that can be most effectively utilized thereon to those that can attain the required degree of adhesion to the underlying chromium layer and yet also permit, after exposure, easy and effective removal thereof from the non-image areas during the subsequent development process. While not fully understood at the present time, it is believed that a combination of the high surface area, porosity and labyrinthine understructure of the electrodeposited chromium layer results in the entrapment of minute amounts of photopolymer in the non-image areas of the developed plate which causes tinting or scumming sensitivity on press. Performance data obtained to date indicates a markedly improved press life and print quality, but with further increases in press life being limited by scumming or tinting rather than by plate wear, railroad tracking or blinding.

The use of sealant coating compositions to improve various aspects of lithographic printing plate performance is broadly old in the art. One prior suggestion is exemplarly disclosed in the 1956 and 1957 Bradstreet et al. U.S. Pat. Nos. 2,763,569 and 2,814,988 and another in the later 1966 Leonard U.S. Pat. No. 3,247,791. In the earlier Bradstreet patents, a method is disclosed for forming a white refractory type coating of extremely minute zirconia crystallites by the rapid thermal decomposition of minute droplets of a dilute solution of ammonium-zirconyl carbonate sprayed toward the surface of a zinc or aluminum lithographic plate substrate maintained at a temperature of 400°-500° F. The later Leonard patent disclosed a different chemical approach for a sealant surface utilizing phosphomolybdate coatings obtained by immersion of a plate in a molybdenum -phosphate solution followed by subsequent immersion in a sealing bath.

This invention may be briefly described, in its broad aspects, as an improved chrome surfaced photopolymer printing plate having a zirconium base, water insoluble, glasslike, thin and transparent compound selectively disposed intermediate the recessed portions of the chromium surface and an overlying coating of unexposed photopolymeric material. In a narrower aspect, the invention includes an improved lithographic photopolymer printing plate compositely formed of a close packed, cragged surfaced and highly porous layer of electrodeposited chromium on an aluminum alloy or steel base substrate, a thin layer of a water insoluble, zirconium base, transparent and glasslike compound selectively disposed in the nether recesses of said chromium layer and an overlying coating of unexposed photopolymeric material. In a still narrower aspect, the invention includes means for modifying the surface area and porosity characteristics of an electrodeposited chromium surface on a photopolymer lithographic printing plate. In still another aspect, the subject invention includes a method for selectively forming a relatively thin layer of a water insoluble, transparent and glasslike zirconium base compound on an electrodeposited surface layer of chromium on an aluminum alloy or steel base substrate photopolymer printing plate.

Among the advantages of the subject invention is the provision of a surface area reducing and porosity modifying compound for application to an electrodeposited chromium surface on a printing plate that is characterized by pronounced and prolonged water and fountain solution insolubility. Another advantage is the provision of a surface area and porosity modifying compound for chrome surfaced printing plates that does not deleteriously affect the adhesion of an overlying coating of photopolymer material thereto and which greatly minimizes background sensitivity and scumming on the non-image areas of a developed and finished printing plate. Another advantage of the subject invention is an improved surface area and porosity modifying compound that inhibits plate corrosion. A still further advantage of the subject invention is the provision of an improved surface area and porosity modifying coating compound for chrome surfaced lithographic photopolymer plates that is of pronounced hydrophobic character when coated with photopolymeric material, but which becomes possessed of pronounced hydrophilic characteristics in the non-image areas of the plate after exposure, development and finishing of the plate. A still further advantage is the provision of a directly chrome plated lithographic photopolymer printing plate that is attended by a marked reduction in tinting and scumming tendencies and an attendant significant increase in effective press life and print quality.

The primary object of this invention is the provision of an improved lithographic photopolymer printing plate.

Another primary object of this invention is the provision of an improved chrome plated lithographic photopolymer printing plate of the type wherein the chrome plated surface is of pronounced hydrophilic character after exposure, developing and finishing and is definitive of the non-image area in a press-ready plate.

Other objects and advantages of this invention will become apparent from the following portions of this specification and from the appended photomicrograph which depicts a presently preferred embodiment of a chromium plated printing plate having a surface area and porosity modifying coating incorporating the principles of this invention disposed thereon.

Referring to the drawings.

Figure 1A:
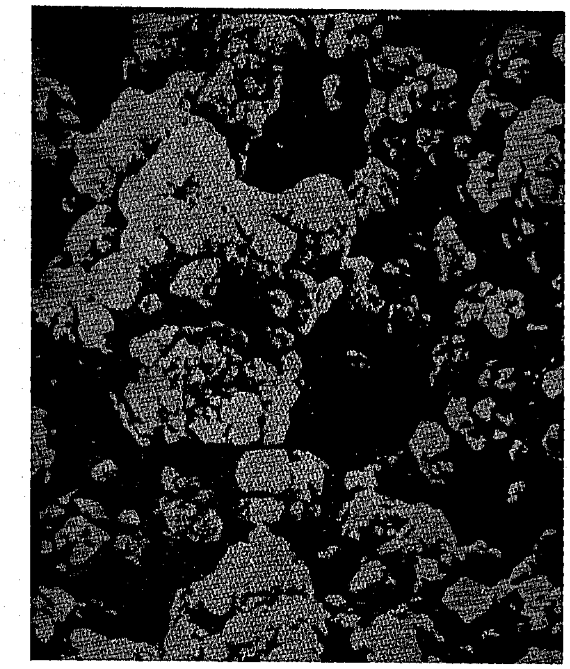
Figure 1B:
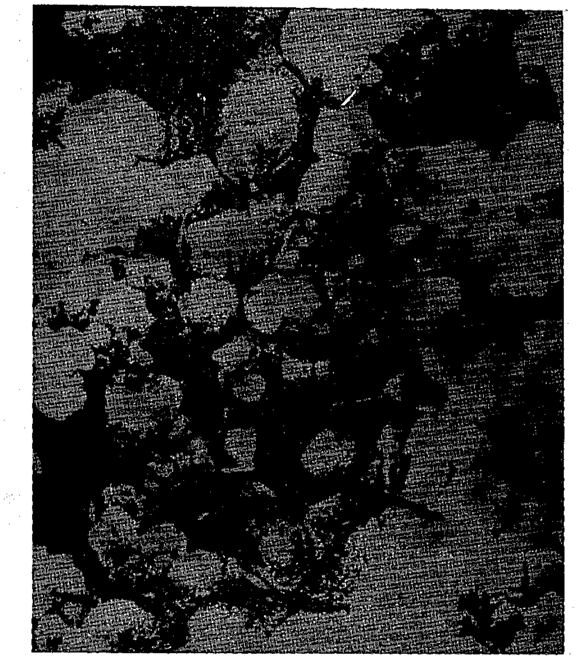
Figure 2A:
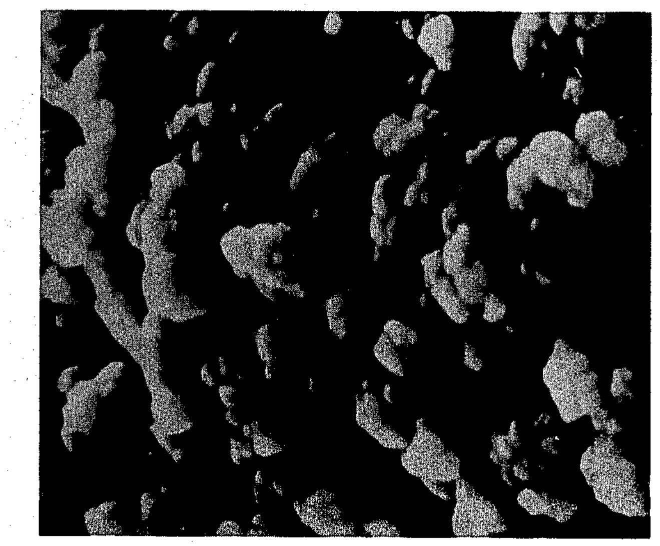
FIG. 2A is a scanning electron photomicrograph (10,000×) of an illustrative lithographic plate having chromium directly plated on an aluminum alloy base substrate prior to the application of the improved surface area and porosity modifying coating thereto.

Referring initially to FIG. 2A, there is shown, in highly magnified form, the nature of the presently preferred chrome plated surface that results from the direct electrodeposition of chromium upon an aluminum alloy base or steel base substrate in general accordance with the practice of the method disclosed in copending application Ser. No. 134,636 filed Apr. 11, 1980, now U.S. Pat. No. 4,371,430, the disclosure of which is incorporated by reference herein. Under the 10,000× magnification there set forth, such directly deposited chromium layer is seen to be characterized by a fine secondary grain structure that provides a surface of relatively rough, discontinuous and crag-like character having numerous closely packed projections and adjacent surface recesses and a labyrinthine understructure all apparently compositely constituted or formed by discrete groups or clusters of coalesced agglomerates of pluralities of relatively small and essentially spheroidate particles that are progressively built up in randomly spaced and separated protuberant groups or clusters during the plating process.

In the practice of the subject invention, chromium plated aluminum alloy or mild steel base substrate, and preferentially of the character as generally shown in FIG. 2A, is initially immersed under ambient conditions in a water solution of ammonium-zirconium carbonate, suitably about 1 to 20% dependent upon the desired thickness of finished coating to be obtained. Relatively concentrated solutions in the order of 20% are commercially available and derivable from AZC and BACOTE 20 solutions obtainable from the Magnesium Elektron Inc. of Flemington, N. J. Any desired reduction in concentration can be effected by appropriate dilution with water. After such immersion and after the excess solution has been drained or has otherwise been removed therefrom by the squeegee action of a soft rubber roller or the like, the plate and the remaining ammonium-zirconium carbonate solution is cured and converted to the desired thin, glasslike, transparent and water insoluble coating layer of generally continuous nature.

Information to date has indicated that such curing or conversion of the liquid coating to the glasslike coating layer is dependent upon the thickness of coating desired and also upon generally inverse time and temperature parameters. We have found for example, that while formation of such glasslike coating layer, dependent upon film thickness desired, may be effected by 24 to 48 hours exposure at ambient room temperature, such curing can be accelerated by elevation of the temperature with accompanying decreases in exposure time. For commercial production wherein an elongate sealant solution coated continuous strip of substrate metal is progressively and continuously advanced through a drying and curing zone, we have found that by raising the temperature of the moving strip to a value between 100° and up to about 400° F. over a time period of about 30 to 40 seconds, and during which time the sealant coated strip is at its highest temperature for a minimum of about 5 to 10 seconds, delivers a product having the desired characteristics.

Such drying or curing results in the conversion of the liquid ammonium-zirconium carbonate solution into the above mentioned thin, water insoluble, substantially uniform, generally transparent, and smooth surfaced, glasslike film.

While not fully understood at the present time, it is believed that the above described heating and curing of the applied ammonium-zirconium carbonate solution results in the in situ formation of a complex zirconium compound of polymeric character in the nature of a generally transparent, substantially uniform, and glasslike thin film.

Figure 2B:
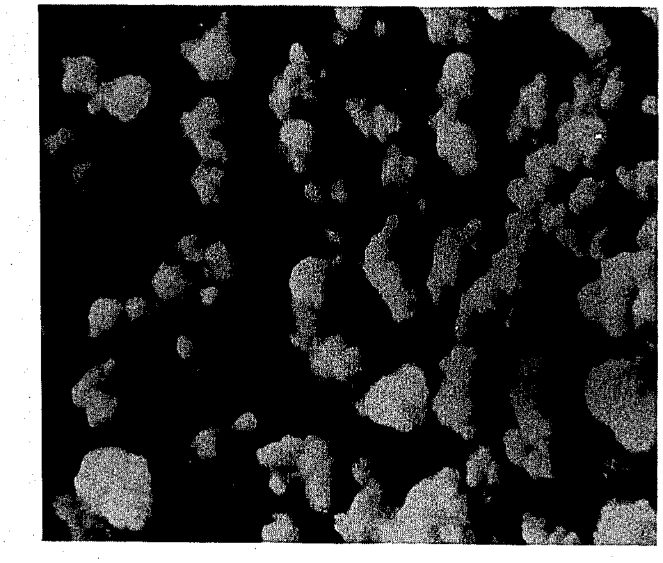
FIG. 2B is a scanning electron photomicrograph (10,000×) showing another illustrative lithographic plate having chromium directly plated on an aluminum alloy base substrate subsequent to the application of the improved surface area and porosity modifying coating thereto.

The coated lithographic plate product that results from the above described series of steps is illustratively depicted in FIG. 2B. As there shown, the specified curing of the applied solution of ammonium-zirconium carbonate results in the formation of an essentially continuous, but somewhat randomly cracked, generally uniform, glasslike film of substantially transparent character and of a thickness (calculated) in the range of from about 30 to about 1200 micrograms per square inch and preferably within the range of from about 125 to 300 micrograms per square inch. It likewise appears that such thin glasslike film is basically transparent in nature, generally somewhat hydrophilic in character and that the principal mass thereof is selectively disposed in the nether portions of the recesses in the close packed craggy surface of the electrodeposited chromium. It further appears that a substantial portion of the craglike peaks of the clusters of agglomerated small spheroidate particles of chromium deposited during the plating operation extend above the principal mass of the glasslike film and that the general close packed craglike structure of the chromium layer is essentially retained independent of whether such peaks are also covered with an extremely thin coating of such glasslike compound or not. It appears also from the photomicrograph FIG. 2B that the resultant glasslike film is operative to effectively bridge over or otherwise cover, except possibly for the cracks present therein, a substantial number of the large and small surface recesses leading to the labyrinthine understructure of the directly electrodeposited chromium layer and to thus modify both the surface area and the porosity characteristics of such chromium layer.

Following the above described drying or curing operation, the plate is then further coated, in accord with conventional practice, with a layer of photopolymer material of known character which is cured or otherwise processed in the manner conventionally attendant lithographic plate preparation.

As pointed out above, the resultant surface of the zirconium base compound modified plate is not only water insoluble but, while initially somewhat hydrophilic in character, is possessed of the ability to strongly adsorb organic materials which will be determinative of its hydrophobic or hydrophilic properties. For example, when coated with photopolymeric material, which is normally hydrophobic in character, such glasslike film apparently takes on relatively strong hydrophobic properties at the coating-photopolymer interface. Its basic water insoluble character and resultant interfacial hydrophobicity, in association with the close packed, craglike contour of the electrodeposited chromium layer at the interface, provides for a markedly improved degree and/or maintenance of adhesion between the applied coating of photopolymer and the composite undersurface in a finished plate. While the mechanics of such improved adhesion are not fully understood, it is presently believed that such is at least partially attributable to the character and selective location of the glasslike layer and possibly also to a limited penetration of the photopolymeric coating into and through the cracks in the glasslike film and a subsequent effectively liquid-proof interlocking of the film and overlying coating together.

As pointed out above, the resultant glasslike film is of almost totally water insoluble character, and such desirable characteristic is maintained through photopolymer application, photopolymer development and subsequent utilization of the finished plate on the press.

A further and totally unexpected advantageous property of the subject glasslike coating is the maintenance of its hydrophobic character at the coating-photopolymer interface until an exposed plate is later developed and finished. After exposure, the plate is finished by selective removal of those portions of the photopolymeric coating definitive of the non-image areas to expose the underlying chromium surface and overlying glasslike coating thereon. Application of a gum arabic finishing solution, for example, to the now exposed chromium surface and overlying glasslike coating thereon, results in a shift in said coating to pronounced hydrophilic character. Information available to date indicates that the re-exposed zirconium base compound coating, after finishing of the plate, is of the same physical character as that shown in FIG. 2B. Such hydrophobic to hydrophilic shift, due apparently to the ability of said glasslike film to adsorb organic materials, in association with the control of porosity of the electrodeposited chromium layer are believed to materially contribute to the observed significant reductions in scumming of the plates during press runs and in the marked increases in press life and print quality that flow therefrom.

What is claimed is:

1. A method of forming a glasslike surface area and porosity modifying coating on a chrome surfaced lithographic printing plate comprising the steps of applying a 1 to 20% water solution of ammonium-zirconium carbonate to the chrome surface of said plate at ambient temperature, removing the excess of said solution therefrom, curing said solution coated lithographic plate by elevation of the temperature thereof to a temperature in the range of about 100° to up to about 400° F. within a period of about 30 to 40 seconds, whereby a thin, essentially continuous, water insoluble, transparent and glasslike surface area and porosity modifying film is formed in situ on said chromium surface.

2. The method set forth in claim 1 wherein said curing step comprises the step of progressively elevating the temperature of said coated plate to a maximum temperature in said 100° to 400° F. range and limiting the minimum duration of exposure to said maximum temperature to about 5 to 10 seconds.

3. The method set forth in claim 1 wherein said elevated temperature is about 230° F. and limiting the duration thereof to about 5 to 10 seconds.

4. The method as set forth in claim 1 wherein the solution coated plate temperature is progressively elevated to a predetermined maximum temperature and thereafter progressively reduced within the total exposure time.

* * * * *